United States Patent [19]

Grosklos et al.

[11] Patent Number: 4,821,383

[45] Date of Patent: Apr. 18, 1989

[54] TERMINAL CRIMPING APPARATUS HAVING MEANS FOR PREVENTING MISFEEDING OF THE TERMINAL STRIP

[75] Inventors: John R. Grosklos, York; Dallas E. Schlegel, Mechanicsburg, both of Pa.

[73] Assignee: AMP Incorporated, Harrisburg, Pa.

[21] Appl. No.: 155,198

[22] Filed: Feb. 16, 1988

[51] Int. Cl.[4] .......... B23P 23/00

[52] U.S. Cl. .......... 29/33 M; 29/564.6; 29/566.2; 29/753

[58] Field of Search .......... 29/33 M, 564, 564.6, 29/566, 566.1, 566.2, 747, 748, 751, 753

[56] References Cited

U.S. PATENT DOCUMENTS

| | | | |
|---|---|---|---|
| 3,292,236 | 12/1966 | Busler et al. | 29/33.5 |
| 3,839,776 | 10/1974 | Anderson et al. | 29/753 |
| 4,025,999 | 5/1977 | Wolyn et al. | 29/753 |
| 4,031,613 | 6/1977 | Brown et al. | 29/753 |
| 4,114,253 | 9/1978 | Loomis et al. | 29/566 |
| 4,718,160 | 1/1988 | Bulanda et al. | 29/753 |

FOREIGN PATENT DOCUMENTS 2185873 1/1974 France .

OTHER PUBLICATIONS

Plasti-Strip-86-785, Jul. 1987 AMP Publication.
Purchasing Guide-4507-1, 1984 AMP Publication.

*Primary Examiner*—John K. Corbin
*Assistant Examiner*—Rick D. Shafer
*Attorney, Agent, or Firm*—Fritz L. Raring; William B. Noll

[57] ABSTRACT

Terminal crimping apparatus having crimping dies and crimping anvils and strip feeding means for feeding terminal strip to a crimping zone between the dies and anvils has a strip lifter mounted on the press ram which lifts the strip above the level of the crimping anvils after completion of a crimping operation. The strip lifter prevents misfeeding of the strip in that after being lifted, the strip is above the surface of the anvil assembly and can be fed therepast in preparation for the next crimping cycle.

13 Claims, 5 Drawing Sheets

TERMINAL CRIMPING APPARATUS HAVING MEANS FOR PREVENTING MISFEEDING OF THE TERMINAL STRIP

FIELD OF THE INVENTION

This invention relates to crimping apparatus of the type used for crimping terminals in strip form onto the ends of wires. The invention is particularly directed to the problem of preventing misfeeding of the terminal strip to the crimping zone of the apparatus.

BACKGROUND OF THE INVENTION

A type of electrical terminal strip which is being used to an increasing extent comprises a continuously molded plastic strip made up of spaced apart tubular insulators which are connected to each other by integral plastic connecting strips. The metallic terminals are inserted into the insulators and at the time of crimping of the leading terminal of the strip onto a wire, the terminal being crimped is severed from the adjoining connecting strips. Terminal strip of this type is used with crimping machines of the type comprising a crimping press and an applicator having a feeding means for feeding the strip to the crimping zone which is between the crimping anvil and the crimping die. During each crimping cycle, the leading terminal is crimped onto a wire and at the same time, the leading terminal is severed from the carrier strip means which may be a separate carrier strip or individual carrier strip connecting sections as described above.

It has been found that where the terminal strip comprises a continuously molded plastic strip of spaced apart insulators and intervening connecting sections, the behavior of the strip is not always predictable and a feeding problem is frequently encountered. The nature of the feeding problem encountered can be appreciated if it is recalled that when the terminal strip is fed, it is necessary to position the leading terminal of the strip between the crimping die and the crimping anvil and in order to do so, the leading terminal must enter the crimping zone at a level above the upper surface of the crimping anvil. If the leading end of the strip is below this upper surface, the leading terminal of the strip or the carrier strip itself will engage the side of the anvil and misfeeding will result. This problem is not ordinarily encountered with terminal strip in which the carrier strip is a metallic strip, but it has been observed with plastic carrier strip. The physical properties of plastic materials, insofar as they relate to the feeding of terminal strip in an applicator, are somewhat variable, and some plastic strips may have less rigidity than others. It has, in fact, been observed that carrier strips of different colors sometimes have seemingly different physical characteristics in this respect indicating that the coloring material added to the polymer at the time of molding affects the properties of the finished strip.

It is impractical to attempt to control the physical properties of the plastic strip in order to avoid the problem discussed above, and the present invention is directed to the achievement of an improved crimping apparatus having features which prevent any misfeeding of the terminal strip as a result of variations in the physical properties of the plastic strip.

THE INVENTION

The invention comprises an apparatus for crimping electrical terminals onto wires, the terminals being in the form of a continuous strip comprising carrier strip means and individual terminals which are connected to the carrier strip means at spaced apart intervals. The apparatus comprises generally a crimping zone having a crimping anvil and a crimping die therein, the crimping anvil having a terminal supporting surface on which the terminal is supported during crimping. The crimpinq die is mounted on a ram which is movable along a path of reciprocation towards and away from the anvil between an open position, in which the die is spaced from the anvil, and a closed position, in which the die is proximate to the anvil. Strip feeding means are provided for feeding the strip along a strip feed path which extends to the crimping zone and which extends normally of the path of reciprocation of the ram so that the leading terminal of the strip is positioned between the die and the terminal supporting surface of the anvil. The apparatus is characterized in that a strip lifter is provided for lifting the strip away from the terminal supporting surface thereby to ensure feeding of the strip and delivery of the leading terminal of the strip to a position between the die and the terminal supporting surface of the anvil. The strip lifter comprises a lifting foot which is beside the anvil and on the upstream side thereof relative to the direction of strip feed. The lifting foot extends transversely of the strip feed path and is coupled to the ram by a foot coupling. The lifting foot is therefore reciprocal with the ram normally of the strip feed path. The terminal supporting surface is between the lifting foot and the ram when the die is in its closed or lowered position, and the lifting foot is between the terminal supporting surface and the ram when the die is in its open or uppermost position. After a crimping operation has been completed and the ram moves from its closed to its open position, the lifting foot is moved with the ram and lifts the terminal strip above the terminal supporting surface of the crimping anvil so that the strip can then be fed over and past the terminal supporting surface thereby to position the next adjacent terminal of the strip in the crimping zone.

In accordance with a further embodiment, the lifting foot coupling comprises a compressible coupling. In one embodiment, a fixed stop surface is provided adjacent to the anvil and on the upstream side thereof. The lifting foot is proximate to the stop surface when the die is in its open position and is against the stop surface during movement of the die from its open position to its closed position. The foot coupling is a lost motion coupling which permits movement of the die to its closed position while the lifting foot is against the stop surface and is immobile.

The lifting foot coupling may comprise a coupling arm which extends from the lifting foot to the ram, an arm guide being provided on the ram and the coupling arm extending slidably through the arm guide. The coupling arm is therefore movable through the arm guide during movement of the die to its closed position and while the lifting foot is against the stop surface. A compressible spring means is preferably interposed between the arm guide and the lifting foot, the spring means serving to maintain the lifting foot in an extended position, relative to the press ram while the lifting foot is spaced from the stop surface. In accordance with a further embodiment, rotation preventing means are provided for preventing rotation of the coupling arm and the lifting foot thereby to maintain the lifting foot in a position which will ensure its engagement with the carrier strip means. The rotation preventing means may comprise an aligning rod which extends parallel to the coupling arm, the aligning rod being secured to the lifting foot and extending slidably through the arm guide. Alternatively, the coupling arm and the opening in arm guide may have a non-circular cross-section so that rotation is prevented by the non-circularity of those parts.

THE DRAWING FIGURES

THE DISCLOSED EMBODIMENT

Figure 1:
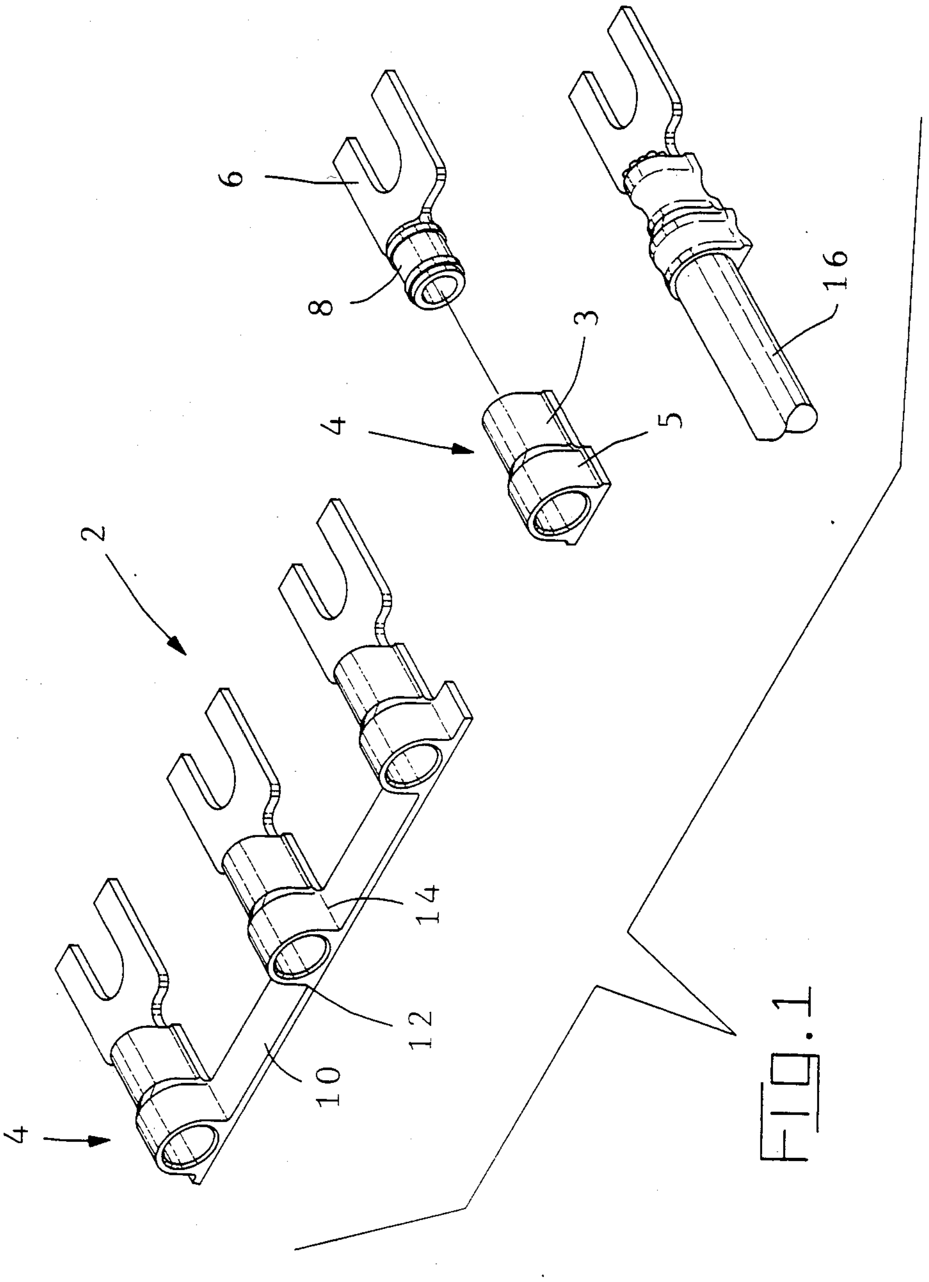
FIG. 1 is a perspective view of a section of terminal strip material, this view showing one terminal severed from the strip and crimped onto the end of a wire.
Figure 2:
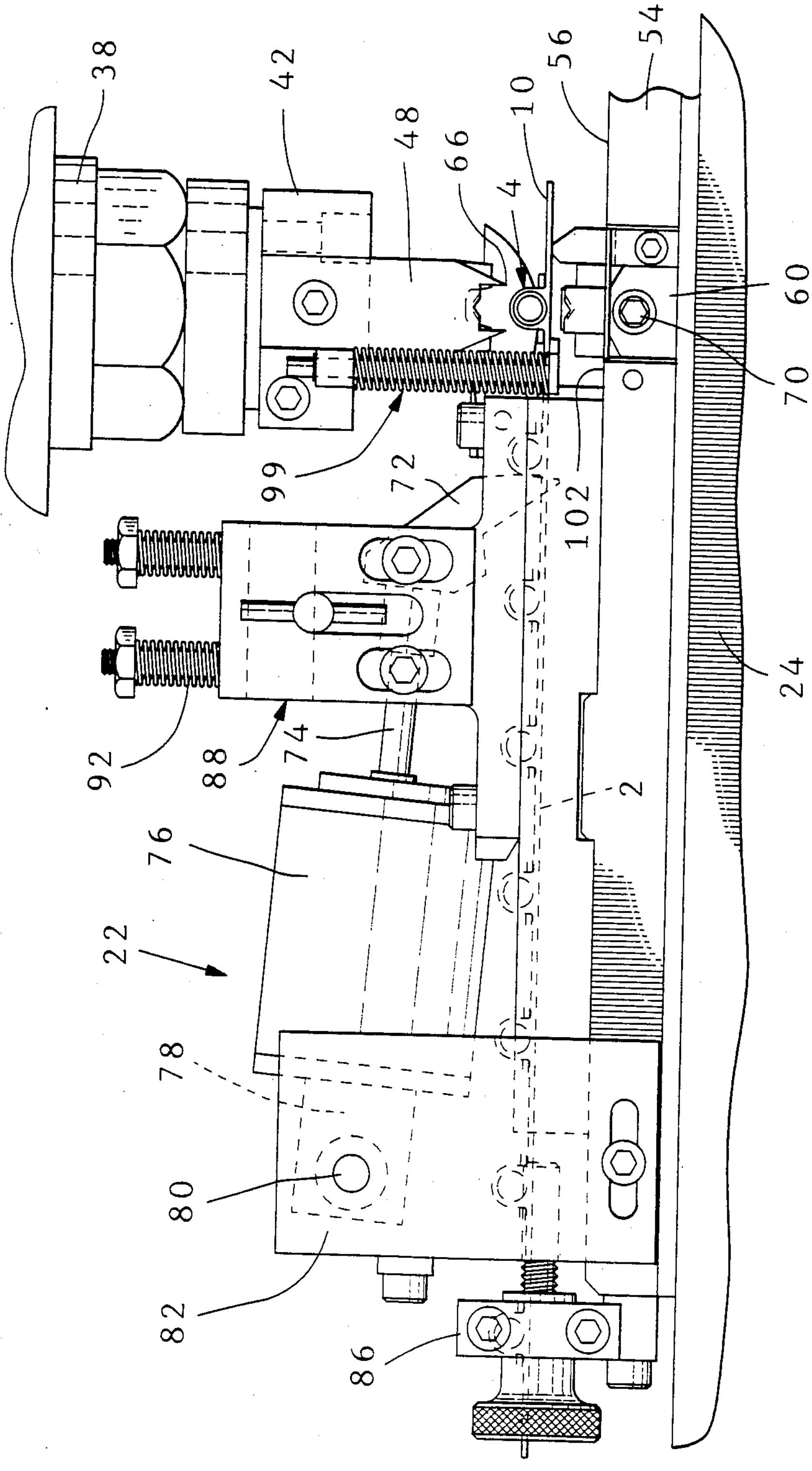
FIG. 2 is a frontal view of a crimping applicator in accordance with the invention; this view shows the positions of the parts when the crimping dies are in their upper positions.
Figure 3:
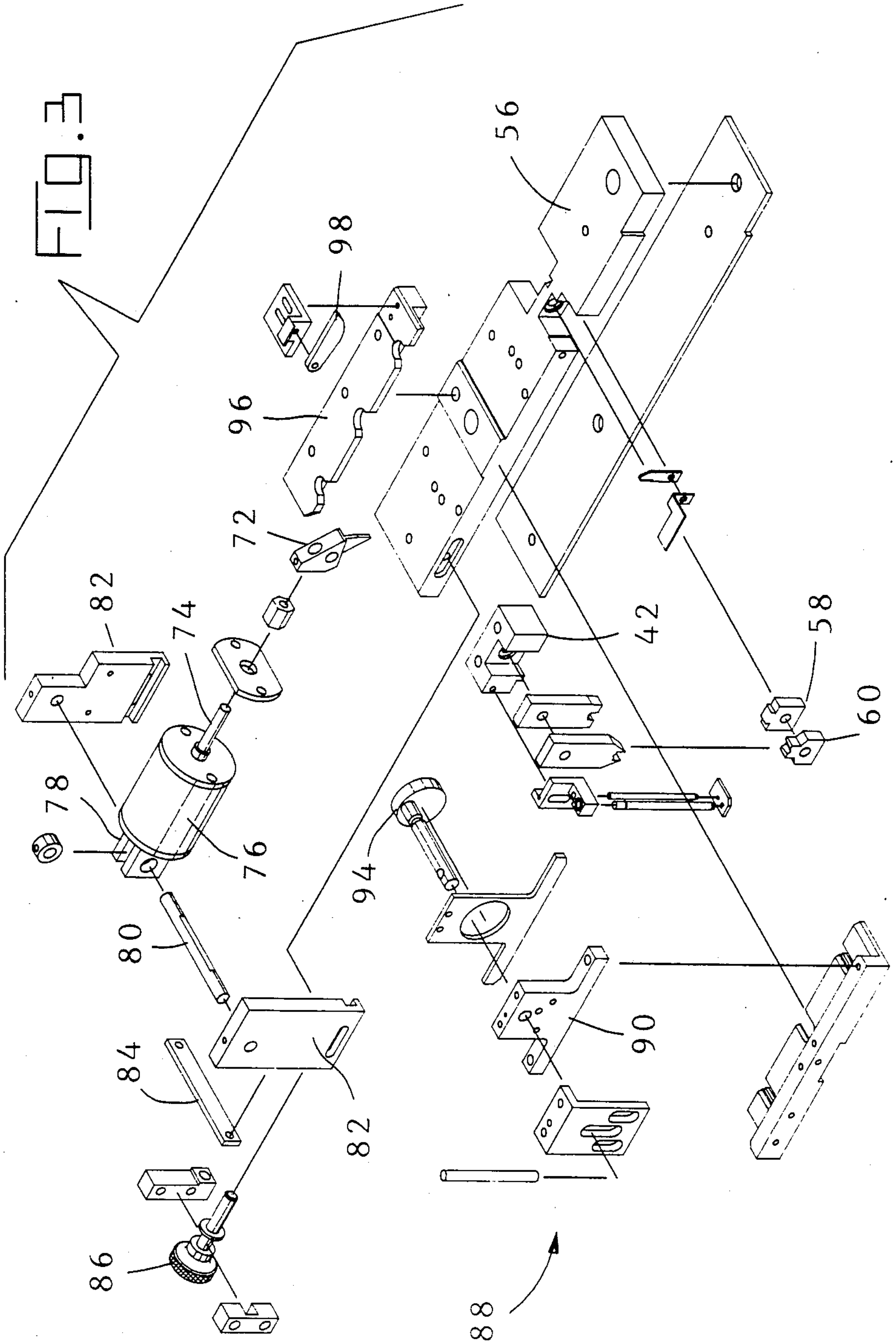
FIG. 3 is a perspective view showing the parts of the applicator exploded from each other.
Figure 4:
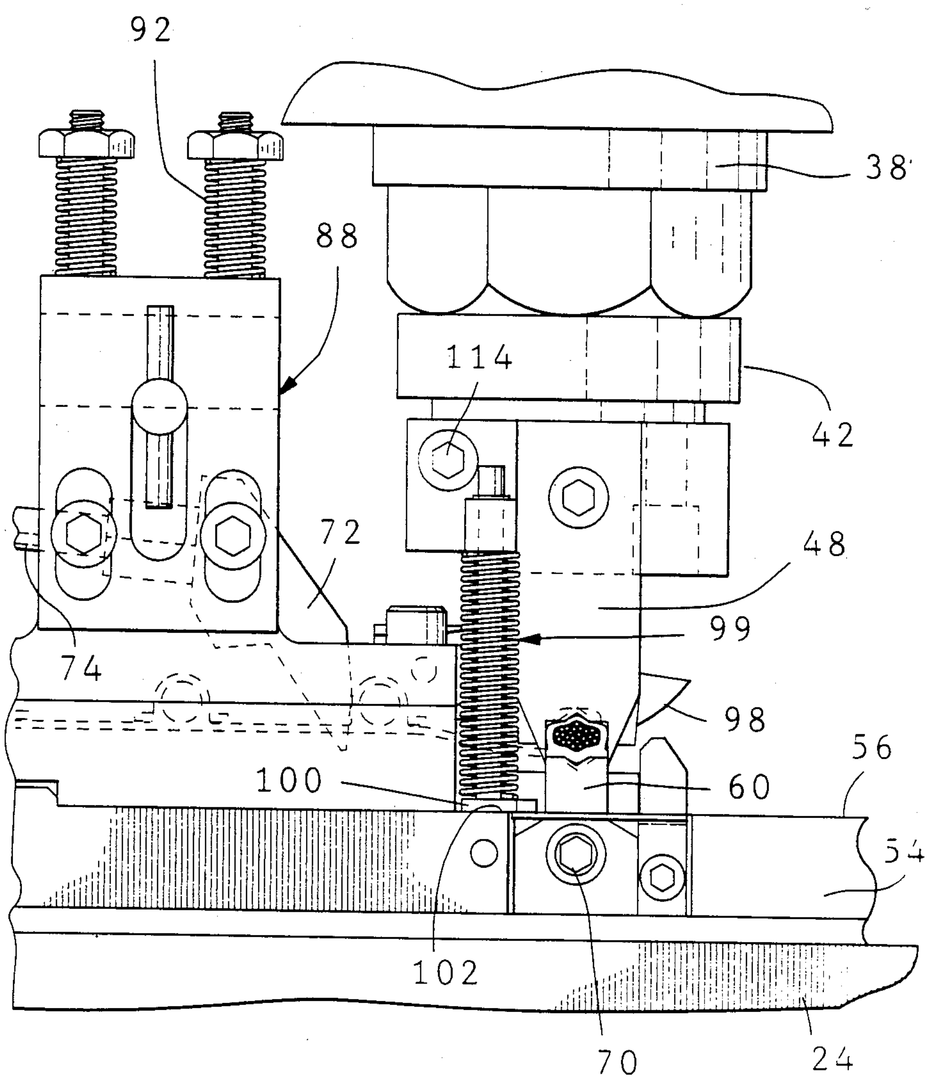
FIG. 4 is a fragmentary frontal view showing the positions of the parts when the crimping dies are in their lowered positions.

The invention is particularly intended for use in a crimping apparatus in which the terminal strip 2 (FIG. 1) comprises a continuous plastic molding having spaced apart tubular insulators 4 which are connected to each other as shown at 12 and 14 by integral connecting sections 10. Each tubular insulator 4 has a relatively smaller diameter wire barrel crimp portion 3 and an insulation crimp portion 5. Each insulator in turn contains a metallic terminal 6 having a tubular ferrule 8 which is inserted into the wire barrel crimp portion 3 of its associated insulator. When the leading terminal of the strip is crimped onto a wire 16, as will be described below, the insulation is stripped from the end portion of the wire and the wire is then inserted into the tubular insulator of the terminal so that the stripped portion is within the metallic ferrule 8 and the adjacent insulated portion of the wire is within the insulation crimp portion 5 of the insulator. During crimping, the insulator is severed from the adjacent connecting strips at 12 and 14.

The apparatus comprises a terminal applicator 22, FIGS. 2–5, which is mounted on the platen 24 of a bench press. The press is not specifically shown and may be of any suitable type. The press has a ram 38 which is reciprocable towards and away from the press platen 24.

A tool holder 42 is secured to the lower end of the press ram and has a vertically extending recess 44 in which are mounted a wire barrel crimper 46 and an insulation crimper 48 by means of a suitable fastener as shown. The crimpers 46, 48 have recesses 50, 52 extending inwardly and upwardly from their lower ends. During crimping, the terminal being crimped is received between the opposed sidewalls of these recesses and is supported on the upper surfaces 62, 64 of crimping anvils which are described below.

The applicator 22 has a base plate 54 which is secured to the surface of the platen 24 by suitable fasteners. The base plate 54 has an upper surface 56 and has mounted in an opening therein by means of fastener 70 the wire barrel anvil 58 and the insulation anvil 60. These anvils have upper surfaces 62, 64 and vertically extending side surfaces so that they will be straddled by the crimpers during crimping. The insulation crimper has leading edges 66 which function as shearing edges in cooperation with side edges 68 of the insulation anvil thereby to sever the terminal being crimped from the adjacent connecting sections 10. The actual crimping zone of the apparatus comprises the zone which is in the vicinity of the upper surfaces 62, 64 of the anvils 58, 60 and the strip of terminals is fed along a strip feed path which leads to this zone.

The feeding mechanism comprises a feed finger 72 which is on the end of a piston rod 74 extending from a piston cylinder 76 which is above the upper surface of the base plate 54. The piston cylinder 76 has ears 78 extending therefrom by means of which it is pivotally mounted on a rod 80 that extends between support plates 82. These support plates are secured to the base plate and are connected to each other by a brace 84 which extends transversely across and above the upper surface of the base plate. An adjusting screw assembly 86 is provided in order to permit fine adjustment of the support plates 82 and therefore the piston cylinder 76 and thereby control the limits of the feed stroke.

It is desirable to provide a conventional drag assembly 88 on the applicator in order to impose a slight frictional drag on the strip as it is fed so that overfeeding or uncontrolled feeding will not take place. The drag assembly 88 may be of a conventional type and has a drag plate 90 which is resiliently biased by springs 92 against the strip. A cam mechanism 94 is provided in order to lift the drag plate from engagement with the strip during adjustment to the applicator or while the strip is being threaded into the applicator. The strip is guided by a strip guide 96 to the crimping zone and a wire stop 98 is provided to prevent insertion of a wire beyond the ferrule portion of the terminal which is being crimped.

The lifting mechanism 99 for lifting the leading end portion of the terminal strip above the surfaces of the crimping anvils, comprises a small plate-like lifting foot 100 which is located beneath the leading end portion of the strip. This lifting foot is positioned above a stop surface 102 against which the lifting foot is pressed when the ram is in its lowered or closed position. The lifting foot is coupled to a coupling arm guide 106, by means of a coupling arm 104. The coupling arm extends slidably through an opening in an ear 108 which extends from the arm guide 106, the arm guide being secured to tool holder 42 by a fastener 114. A snap ring 110 is provided on the coupling arm above the ear 108 so that the coupling arm can move upwardly through the opening in the ear but is prevented from moving downwardly beyond an extended position. The lifting foot is normally maintained in its extended position by means of a coil spring 112 which is interposed between the foot 100 and the ear 108.

It is desirable to provide a means for preventing rotation of the coupling arm and the coupling foot so that the foot will be maintained in its proper position which is beneath the terminal strip. The anti-rotation means of the disclosed embodiment comprises an aligning rod 116 which is secured to the lifting foot and which extends parallel to the coupling arm 104 through a second opening in the ear 108.

The operating cycle of the apparatus is as follows. Prior to the beginning of an operating cycle, a terminal will have been fed during the previous operating cycle to a position between the crimpers and the anvils and the leading end portion of the strip will be resting on the lifting foot 100 which is above the upper surfaces of the anvils so that the strip will be between the dies and anvils with the leading terminal substantially on the upper surfaces of the crimping anvils. The operator first inserts the stripped end of a wire into the leading terminal and thereafter closes a switch or actuates a valve to cause the ram to move downwardly to its closed position and then upwardly to its open position. During the downward stroke of the ram, the lifting foot is initially moved downwardly until it engages the stop surface 102. Thereafter, the ram continues to be moved downwardly with accompanying compression of the spring 112 until the terminal is crimped onto the wire. During this portion of the cycle, the tubular insulator 4 of the terminal will be severed from the adjacent connecting strip by the severing edges discussed above. During movement of the ram upwardly to its open position, the lifting foot will remain against the stop surface 102 until the foot is in its extended position, that is until the snap ring 110 is against the ear 108. Thereafter, the lifting foot will move upwardly with the ram and will raise the connecting section of the terminal strip which is at the leading end of the strip at this stage of the cycle. Since the leading end portion of the strip is thus raised above the upper surfaces of the crimping anvils, the strip can then be fed without there being any danger of the leading end of the strip engaging the side surfaces of the anvils thereby causing a misfeeding or jamming of the apparatus.

Figures 5, 6:
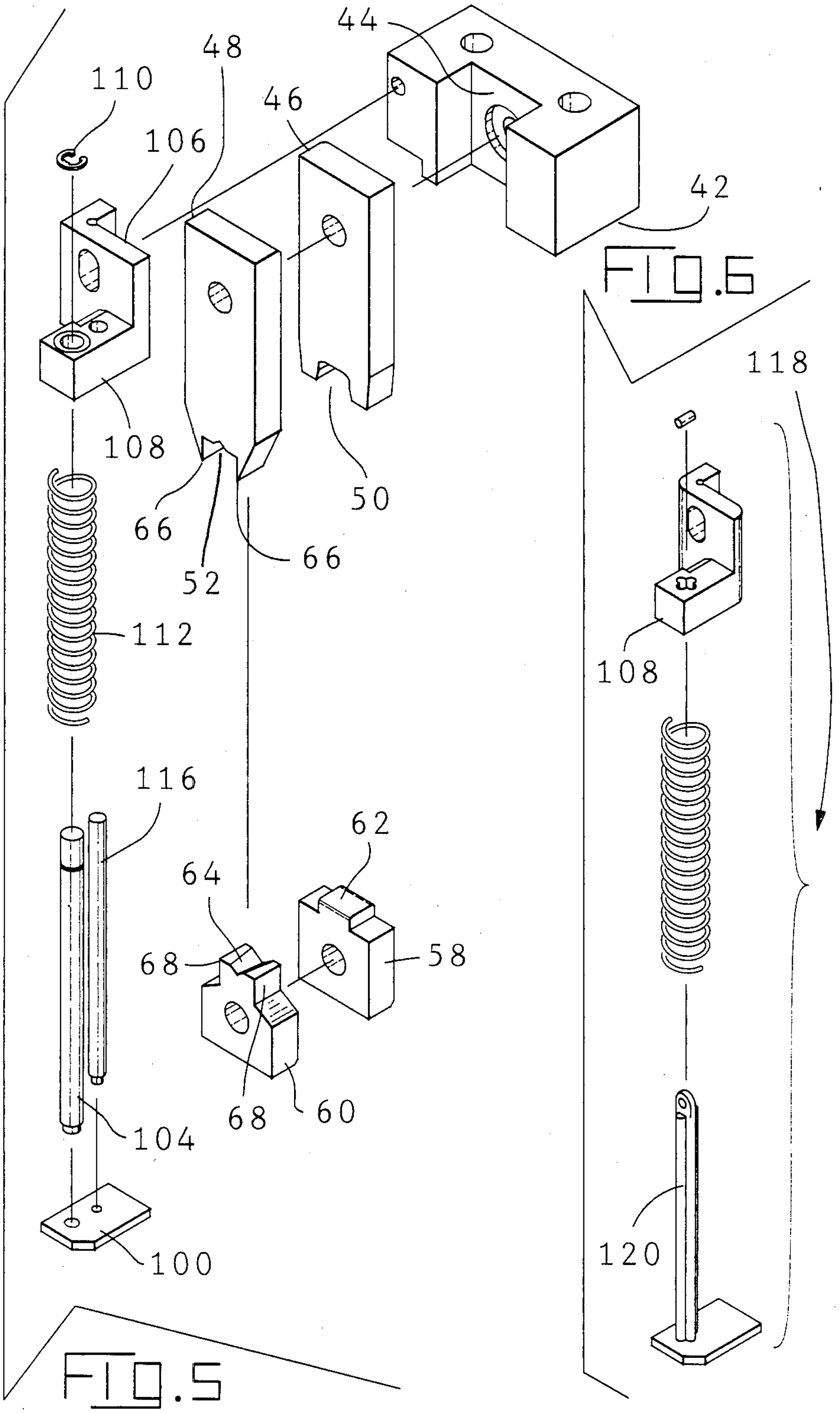
FIG. 5 is an exploded perspective view of the crimping dies and anvils and showing the strip lifting device.
FIG. 6 is a view showing an alternative embodiment.

FIG. 6 shows an alternative embodiment 118 of the invention in which the need for a separate aligning rod is eliminated. In this embodiment, the coupling arm 120 has a noncircular (in the disclosed embodiment cross-shaped) cross section, and the opening in the ear 108 would have a similar cross section so that rotation is prevented by virtue of the fact that the arm cannot rotate in the noncircular opening. The lifting foot and the coupling arm of the embodiment shown in FIG. 8 can be of molded plastic if desired.

It will be apparent from the foregoing description that a crimping apparatus fitted with a strip lifting mechanism in accordance with the invention is virtually in tune to misreading of the strip as a result of the physical characteristics of the molded terminal strip. If the strip should be pushed downwardly when the leading terminal is crimped onto a wire so that the adjacent connecting section is lodged against the side surfaces of the anvils, the lifting foot will pull this connecting section upwardly until it is above the upper surfaces of the anvils and feeding of the strip for the next operating cycle can therefore take place.

We claim:

1. Apparatus for crimping electrical terminals onto wires, the terminals being in the form of a continuous strip comprising carrier strip means and individual terminals which are connected to the carrier strip means at spaced apart intervals, the apparatus comprising a crimping zone having a crimping anvil and a crimping die therein, the crimping anvil having a terminal supporting surface on which the terminal is supported during crimping, the crimping die being mounted on a ram which is movable along a path of reciprocation towards and away from the anvil between an open position, in which the die is spaced from the anvil, and a closed position, in which the die is proximate to the anvil, and strip feeding means for feeding the strip along a strip feed path which extends to the crimping zone and normally of the path of reciprocation of the ram so that the leading terminal of the strip is positioned between the die and the terminal supporting surface of the anvil, the apparatus being characterized in that:

a strip lifter is provided for lifting the strip away from the anvil thereby to ensure feeding of the strip and delivery of the leading terminal on the strip to a position between the die and the terminal supporting surface of the anvil, the strip lifter comprising a lifting foot which is beside the anvil and coupled to the crimping die on the upstream side thereof relative to the direction of strip feed, the lifting foot extending transversely of the strip feed path, the lifting foot being coupled to the ram by a foot coupling and being reciprocal with the ram normally of the strip feed path, the terminal supporting surface being between the lifting foot and the ram when the die is in its closed position, the lifting foot being between the terminal supporting surface and the ram when the die is in its open position whereby, after the leading terminal of the strip has been crimped onto a wire, the die moves from its closed position to its open position, and the lifting foot is moved by the foot coupling towards and past the strip so that the lifting foot lifts the carrier strip means away from the terminal supporting surface, and the strip can then be fed over and past the terminal supporting surface thereby to position the next adjacent terminal of the strip in the crimping zone.

2. Apparatus as set forth in claim 1 characterized in that the foot coupling comprises a compressible coupling.

3. Apparatus as set forth in claim 1, characterized in that a fixed stop surface is provided adjacent to the anvil and on the upstream side thereof, the lifting foot being proximate to the stop surface when the die is in its open position, the lifting foot being against the stop surface during movement of the die from its open position to its closed position, the foot coupling being a lost motion coupling which permits movement of the die to its closed position while the lifting foot is against the stop surface and is immobile.

4. Apparatus as set forth in claim 3 characterized in that the foot coupling comprises a coupling arm which extends from the lifting foot to the ram.

5. Apparatus as set forth in claim 4 characterized in that the ram has an arm guide thereon, the coupling arm extending slidably through the arm guide, the coupling arm being movable through the arm guide during movement of the die to its closed position and while the lifting foot is against the stop surface.

6. Apparatus as set forth in claim 5 characterized in that a compressible spring means is interposed between the arm guide and the lifting foot, the spring means serving to maintain the lifting foot in an extended position, relative to the press ram, when the lifting foot is spaced from the stop surface, the spring means being compressed during movement of the die to its closed position and while the lifting foot is against the stop surface.

7. Apparatus as set forth in claim 6 characterized in that the spring means comprises a coil spring which is in surrounding relationship to the coupling arm, one end of the coil spring being against the arm guide, the other end of the spring being against the lifting foot.

8. Apparatus as set forth in claim 7 characterized in that rotation preventing means are provided for preventing rotation of the coupling arm and the lifting foot thereby to maintain the lifting foot in a position which will ensure its engagement with the carrier strip means.

9. Apparatus as set forth in claim 8 characterized in that the rotation preventing means comprises an aligning rod which extends parallel to the coupling arm, the aligning rod being secured to the lifting foot and extending slidably through the arm guide.

10. Apparatus as set forth in claim 8 characterized in that strip shearing means are provided on the die and anvil for shearing the carrier strip means at a location adjacent to the terminal supporting surface concomitantly with crimping of the terminal onto the wire, the lifting foot being upstream, relative to the direction of strip feed, from the shearing means.

11. Apparatus as set forth in claim 8 characterized in that the continuous strip comprises a continuous molded strip having spaced apart terminal insulators integral therewith, the carrier strip means comprising carrier strip connecting sections which extend between, and are integral with, adjacent terminal insulators, the apparatus having shearing means on the die and anvil for shearing the terminal insulator of the terminal being crimped from its associated connecting section concomitantly with crimping of the terminal, the lifting foot being effective to lift the connecting section which has been sheared from the crimped terminal.

12. Apparatus as set forth in claim 1 characterized in that strip shearing means are provided on the die and anvil for shearing the carrier strip means at a location adjacent to the terminal supporting surface concomitantly with crimping of the terminal onto the wire, the lifting foot being upstream, relative to the direction of strip feed, from the shearing means.

13. Apparatus as set forth in claim 1 characterized in that the continuous strip comprises a continuous molded strip having spaced apart terminal insulators integral therewith, the carrier strip means comprising carrier strip connecting sections which extend between, and are integral with, adjacent terminal insulators, the apparatus having shearing means on the die and anvil for shearing the terminal insulator of the terminal being crimped from its associated connecting section concomitantly with crimping of the terminal, the lifting foot being effective to lift the connecting section which has been sheared from the crimped terminal.

* * * * *